United States Patent [19]

Likas

[11] 4,022,488
[45] May 10, 1977

[54] GUARD FRAME FOR BICYCLE TANDEM CHILD SEAT

[76] Inventor: Richard J. Likas, 825 High Ave., Sheboygan, Wis. 53081

[22] Filed: Mar. 15, 1976

[21] Appl. No.: 667,019

[52] U.S. Cl. .......................... 280/289 A; 280/202; 280/756
[51] Int. Cl.² ........................................ B62J 27/00
[58] Field of Search ............. 280/289 A, 202, 756, 280/281; 296/99 A, 102; 297/DIG. 9

[56] References Cited

UNITED STATES PATENTS

| 1,473,956 | 11/1923 | Eyre | 280/756 X |
| 3,164,396 | 1/1965 | Morris | 280/202 |
| 3,256,034 | 6/1966 | Condray | 296/102 |
| 3,802,598 | 4/1974 | Burger | 280/202 |

FOREIGN PATENTS OR APPLICATIONS

| 581,891 | 9/1958 | Italy | 296/102 |

Primary Examiner—Joseph F. Peters, Jr.
Assistant Examiner—Terrance L. Siemens
Attorney, Agent, or Firm—Clarence A. O'Brien; Harvey B. Jacobson

[57] ABSTRACT

An upright protective frame including opposite side upstanding portions interconnected at their upper ends by means of a connecting portion extending and connected therebetween is provided. The lower end portions of the upstanding opposite side portions of the protective frame include structure for anchoring to the lower opposite side rearwardly projecting portions of a bicycle frame between which the rear wheel of the bicycle is journaled and structure is provided for bracing vertical mid-portions of the opposite side upstanding portions of the protective frame relative to the upper rear portion of a bicycle frame from which the seat of the bicycle is supported. In addition, the structure provided for connecting the lower ends of the upstanding side portions of the protective frame to the opposite side rearwardly projecting portions of the bicycle frame between which the rear bicycle wheel is conventionally journaled includes a generally horizontally disposed and rearwardly opening semi-cylindrical portion which projects forwardly of the lower end portions of the upstanding opposite side portions of the protective frame and has its central portion provided with structure for anchoring to the upper rear portion of the bicycle frame from which the bicycle seat is conventionally supported.

8 Claims, 4 Drawing Figures

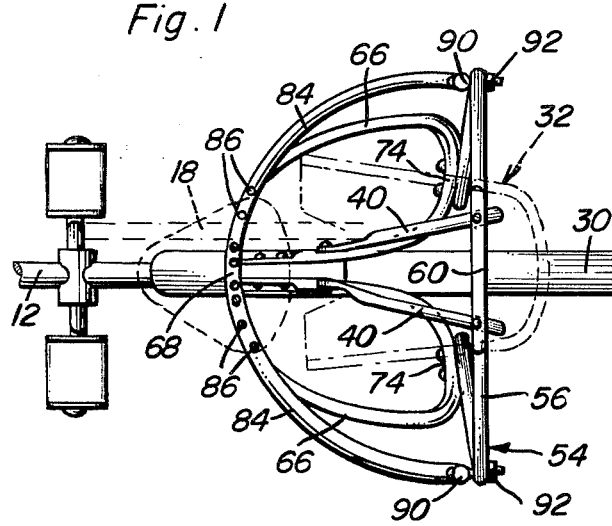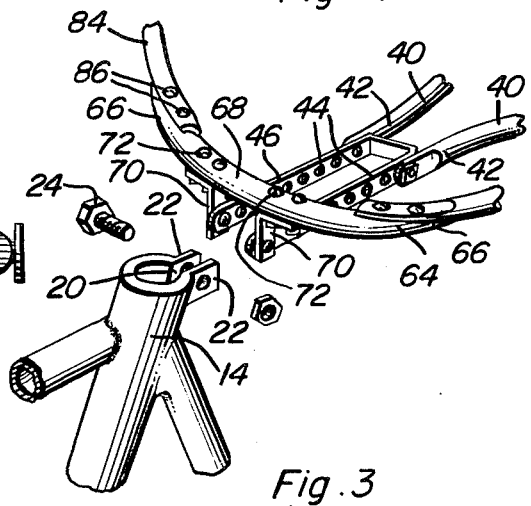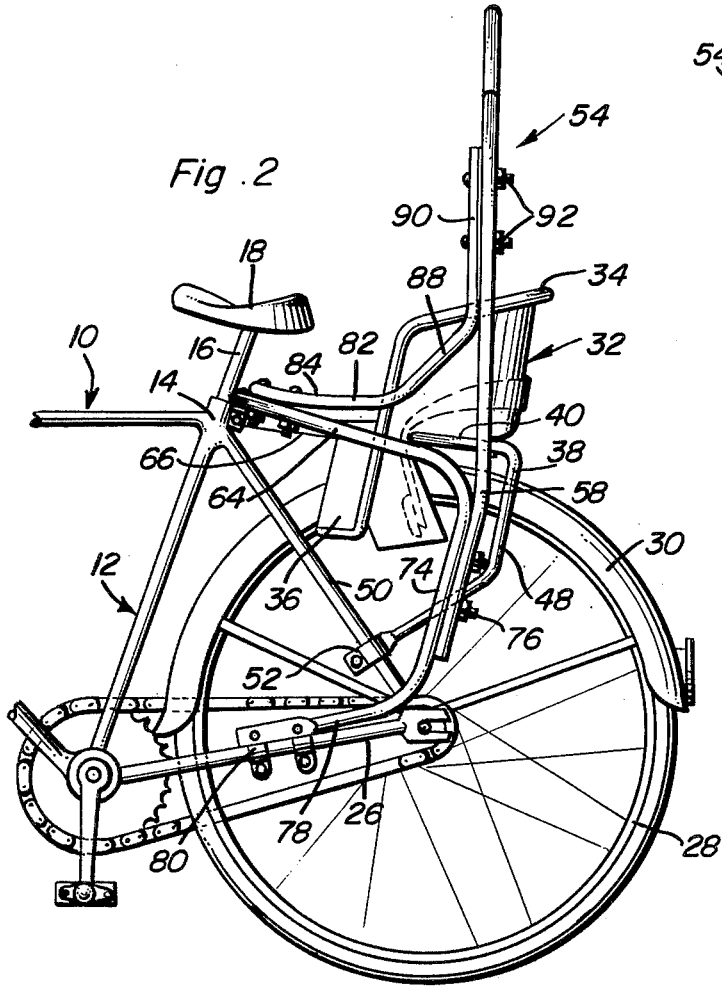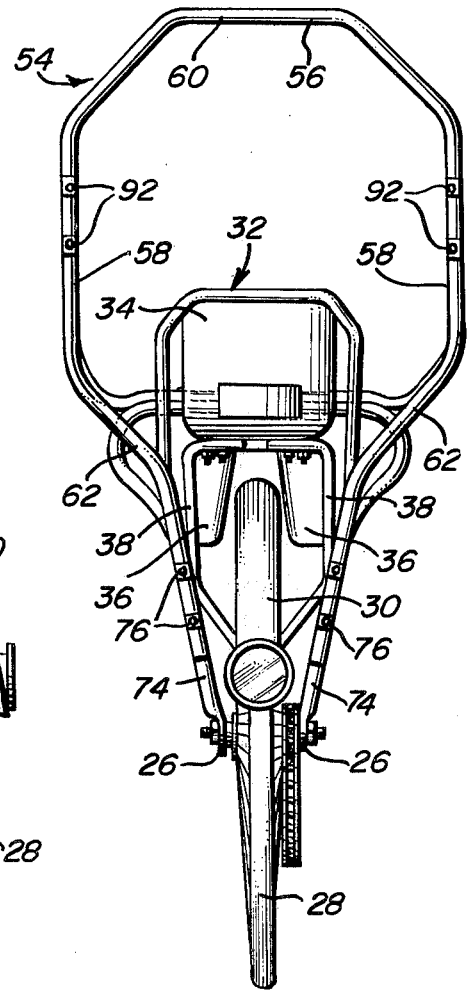

GUARD FRAME FOR BICYCLE TANDEM CHILD SEAT

BACKGROUND OF THE INVENTION

Various forms of protective frames for passengers and operators of various types of vehicles have been heretofore provided. Some forms of protective frames have been designed specifically for use in motor cycles and other vehicles which are subject to not too infrequent upset, but little attention has been given to the need for a protective frame to enclose a child riding in tandem on a bicycle or similar vehicle behind the operator thereof.

Examples of various forms of protective frames including structure which is similar in some respects to various features of the instant invention are disclosed in U.S. Pat. Nos. 1,473,956, 2,783,056, 2,828,970, 2,921,799, 3,146,001 and 3,802,598.

BRIEF DESCRIPTION OF THE INVENTION

The guard or protective frame of the instant invention is in the form of a generally inverted U-shaped frame adapted to straddle the rear wheel portion of a bicycle over which tandem seats for children are conventionally mounted. Structure is provided for anchoring the lower ends of the legs of the inverted U-shaped frame to the lower rearwardly projecting frame portions of the bicycle between which the rear bicycle wheel is conventionally journaled and a pair of upper and lower horizontally disposed and rearwardly opening U-shaped braces are provided with their mid-portions including structure for attachment to the upper rear portion of a bicycle frame from which the operator's seat is supported and the rear ends of the upper U-shaped frame are directed upwardly and secured to the corresponding legs of the inverted U-shaped protective frame while the rear ends of the lower U-shaped frame are directed downwardly and have the lower ends of the legs of the inverted U-shaped frame secured thereto. Accordingly, the inverted U-shaped frame provides protection from either side to a child disposed in a tandem child seat mounted above the rear wheel of a bicycle and the upper and lower rearwardly opening U-shaped frames provide ample guarding for the leg and knee areas of a child disposed in the aforementioned tandem seat against impact with a foreign object toward which the child's legs and knees may be advanced during forward movement of the associated bicycle.

The main object of this invention is to provide a protective or guard frame for a tandem mounted child's seat supported above the rear wheel of a bicycle and behind the usual seat of the bicycle.

Another object of this invention is to provide a guard or protective frame constructed in a manner so as to be readily attachable to substantially all types of bicycles which may be used to support a tandem child's seat.

Yet another object of this invention is to provide a guard frame including upstanding opposite side portions thereof for disposition outwardly of and on opposite sides of the associated child's seat.

Another very important object of this invention is to provide a guard frame including rearwardly opening and forwardly projecting upper and lower horizontal U-shaped braces for attaching the upstanding opposite side portions of the frame to a forwardly displaced bicycle seat mounting portion of the frame of the associated bicycle so as to thereby protect the leg areas of a child seated in a tandem seat from engagement with objects moving theretoward from opposite side as well as forward positions.

A final object of this invention to be specifically enumerated herein is to provide a guard frame in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of the rear portion of a conventional form of bicycle with the guard frame of the instant invention in operative position on the rear of the bicycle, the usual operator's seat of the bicycle and an associated tandem child's seat being illustrated in phantom lines;

FIG. 2 is a side elevational view of the assemblage illustrated in FIG. 1 with the bicycle seat and child's seat illustrated in solid lines;

FIG. 3 is a rear elevational view of the assemblage illustrated in FIG. 2 as seen from the right side thereof; and FIG. 4 is a fragmentary exploded perspective view illustrating the manner in which the forward portions of the forwardly projecting and rearwardly opening bracing structures of the guard frame are attached to the upper rear portion of the bicycle frame from which a bicycle seat is conventionally supported.

DETAILED DESCRIPTION OF THE INVENTION

Referring now more specifically to the drawings, the numeral 10 generally designates a conventional form of bicycle including a main frame referred to in general by the reference numeral 12. The frame 12 includes an upper rear portion 14 from which the mounting shank 16 of a conventional bicycle seat is supported. The upper rear portion 14 is longitudinally slotted as at 20 and includes apertured ears 22 through which a fastener 24 is secured in order to clamp the upper end of the portion 14 about the mounting shank 16 of the seat 18.

The frame 12 additionally includes opposite side rearwardly projecting portions 26 between which a rear wheel assembly 28 is journaled and a rear fender 30 is supported in position overlying the upper periphery of the rear wheel assembly 28.

The foregoing comprises a description of a conventional form of bicycle. In addition, it may be seen that a conventional form of tandem child's seat referred to in general by the reference number 32 is supported above the rear fender 30. The tandem child's seat includes a molded plastic seat portion 34 provided with opposite side lower portions 36 to receive the lower legs and feet portions of a child disposed in the seat portion 34. A pair of mounting bar assemblies 38 include upper horizontal portions 40 underlying opposite side portions of the seat portion 34 and to which the latter is secured. The upper horizontal portions 40 include forward ends 42 which are secured to the base end portions of the legs 44 of a horizontally disposed and forwardly opening U-shaped mounting frame 46. The forward ends of the legs 44 are mounted to the upper rear portion 14 by means of the fastener 24 with the forward ends of the legs 44 lapped over the outer sides of the apertured ears 22. In addition, the mounting bar assemblies 38 include forwardly and downwardly inclined portions 48 which extend downwardly from the rear ends of the upper horizontal portions 40 and are attached to rearwardly and downwardly inclined braces 50 of the frame 12 interconnecting the upper rear portion 14 and the rear ends of the portions 26, the lower ends of the portions 48 being secured to the braces 50 as at 52.

The guard or protective frame of the instant invention is referred to in general by the reference numeral 54 and includes an upright generally inverted U-shaped frame 56 including a pair of upstanding opposite side portions 58 interconnected at their upper ends by means of a horizontal transverse bight portion 60 extending and secured therebetween. The portions 58 and 60 are integrally formed of a single piece of tubing and the lower ends of the opposite side portions or legs 58 are angled inwardly as at 62.

A lower generally horizontally disposed, rearwardly opening and U-shaped bracing frame 64 is included and consists of a pair of opposite side outwardly convex legs 66 interconnected at their forward ends by means of a forwardly convex integral arcuate bight portion 68. A pair of L-shaped mounting brackets 70 are supported from spaced portions of the underside of the central area of the bight portion 68 by means of suitable fasteners 72 and the depending flanges of the brackets 70 are also anchored to the upper rear portion 14 of the frame 12 by means of the fastener 24.

The rear ends of the legs 66 are downwardly directed to form upstanding portions 74 to which the lower ends of the legs 58 are secured by means of fasteners 76 and the lower ends of the upstanding portions 74 terminate in forwardly directed portions 78 secured to longitudinal mid-portions of the rearwardly directed opposite side lower portions 26 of the frame 12 as at 80.

The guard or protective frame 54 further includes an upper horizontal and rearwardly opening frame 82 including outwardly convex and forwardly and inwardly curving opposite side portions 84 whose forward extremities are secured in overlying relation to opposite side portions of the bight portion 68 by means of fasteners 86. The rear ends of the portions 84 are angled rearwardly and upwardly as at 88 and then substantially vertically upwardly as at 90 and are secured to upper portions of the legs 58 by means of fasteners 92. Although the frame 82 consists of a pair of opposite side members which are not integrally joined, inasmuch as the forward ends of the portions 84 are rigidly anchored to the bight portion 68 in only slightly spaced relation the portions 84 effectively define a second horizontally disposed and rearwardly opening upper frame. The legs 66 of the frame 64 and the portions 84 of the frame 82 effectively protect the leg and knee areas of a child disposed in the seat portion 34 against impact from the front in the case of the bicycle 10 experiencing an accident. Thus, it may be seen that a child disposed in the seat portion 34 is protected from above, from both sides and from the front.

The entire guard or protective frame 54, except for the L-shaped mounting bracket 70 and the various fasteners is constructed of tubular steel and therefore offers considerable protection with a minimum of weight.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a bicycle frame of the type including an upper rear portion for the support of a seat therefrom and a pair of opposite side rearwardly projecting portions for journaling a rear wheel therebetween, a protective guard structure for protecting a child's seat supported from said frame rearward of said upper rear portion, said guard structure comprising an upright protective frame including opposite side upstanding portions interconnected at their upper ends by means of a connecting portion extending and connected therebetween, means anchoring the lower end portions of said upstanding portions to corresponding opposite side rearwardly projecting portions of said bicycle frame, and means extending between and interconnecting vertical mid-portions of said upstanding portions and said upper rear portion of said bicycle frame, said protective frame being spaced behind said upper rear portion of said bicycle frame.

2. The combination of claim 1 wherein said guard structure includes a generally horizontally disposed substantially U-shaped and rearwardly opening frame including opposite side front to rear extending legs interconnected at their forward ends by means of a forward bight portion extending therebetween, the central portion of said horizontal frame bight portion being anchored relative to said upper rear frame portion and the rear ends of said legs being downwardly directed and anchored relative to the corresponding opposite side rearwardly projecting portions of said bicycle frame.

3. The combination of claim 2 wherein the legs of said horizontal frame are arcuate and outwardly convex.

4. The combination of claim 2 wherein the upper ends of the legs of said upright frame include inwardly and upwardly inclined end portions, said bight portion of said upright frame extending between and interconnecting the upper ends of said inclined end portions.

5. The combination of claim 4 wherein the legs of said horizontal frame are arcuate and outwardly convex.

6. The combination of claim 1 wherein said guard structure includes a generally horizontally disposed substantially U-shaped and rearwardly opening frame including opposite side front to rear extending legs interconnected at their forward ends by means of a forward bight portion extending therebetween, the central portion of said horizontal frame bight portion being anchored relative to said upper rear frame portion and the rear ends of said legs being downwardly directed and anchored relative to the corresponding opposite side rearwardly projecting portions of said bicycle frame, said guard structure further including a pair of arcuate opposite side and outwardly convex arms extending along opposite sides of said frame, the forward ends of said arms overlying and secured to spaced central portions of the bight portion of said horizontal frame and the rear ends of said arms including upwardly and rearwardly directed end portions anchored to the upstanding opposite side portions of said upright frame.

7. The combination of claim 6 wherein the upper ends of the legs of said upright frame include inwardly and upwardly inclined end portions, said bight portion of said upright frame extending between and interconnecting the upper ends of said inclined end portions.

8. The combination of claim 7 wherein the legs of said horizontal frame are arcuate and outwardly convex.

* * * * *